Sept. 16, 1941.   A. R. MORRISON   2,256,212
INHALATOR
Filed June 6, 1939   3 Sheets—Sheet 1

ALAN R. MORRISON
INVENTOR

BY O. W. Lee
ATTORNEY

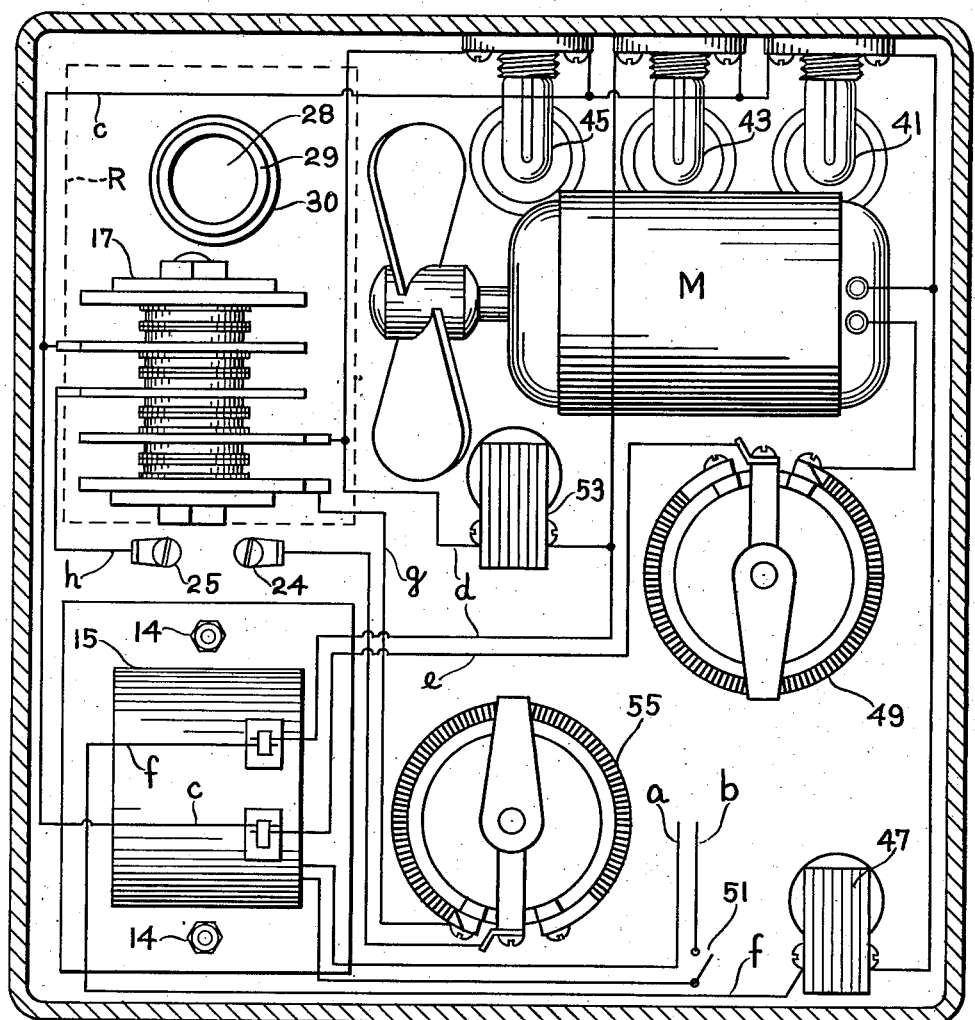
FIG. 4
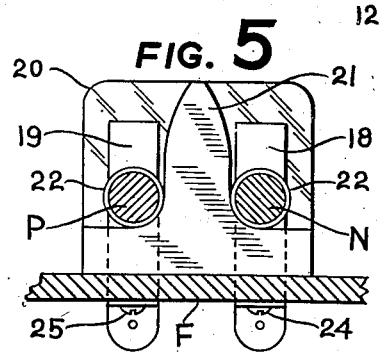
FIG. 5
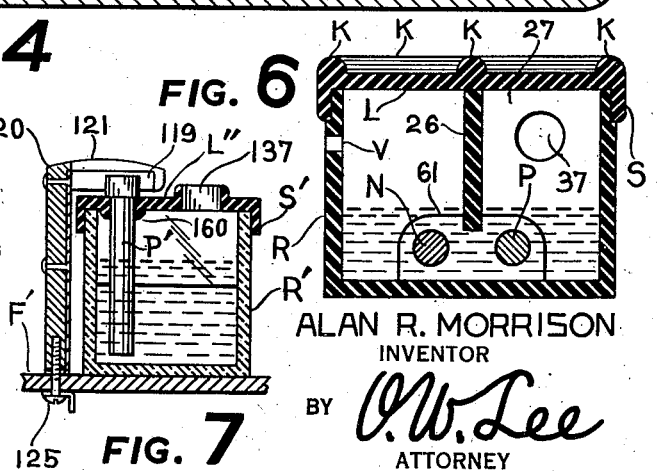
FIG. 6
FIG. 7
ALAN R. MORRISON
INVENTOR
BY O. W. Lee
ATTORNEY Sept. 16, 1941.  A. R. MORRISON  2,256,212
INHALATOR
Filed June 6, 1939  3 Sheets-Sheet 3
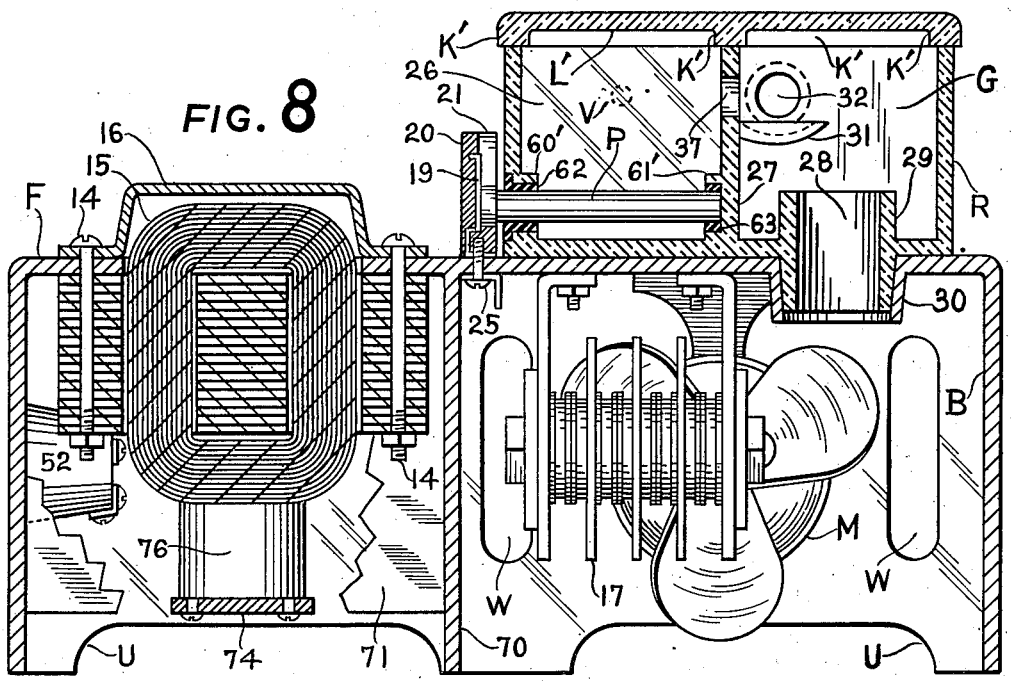
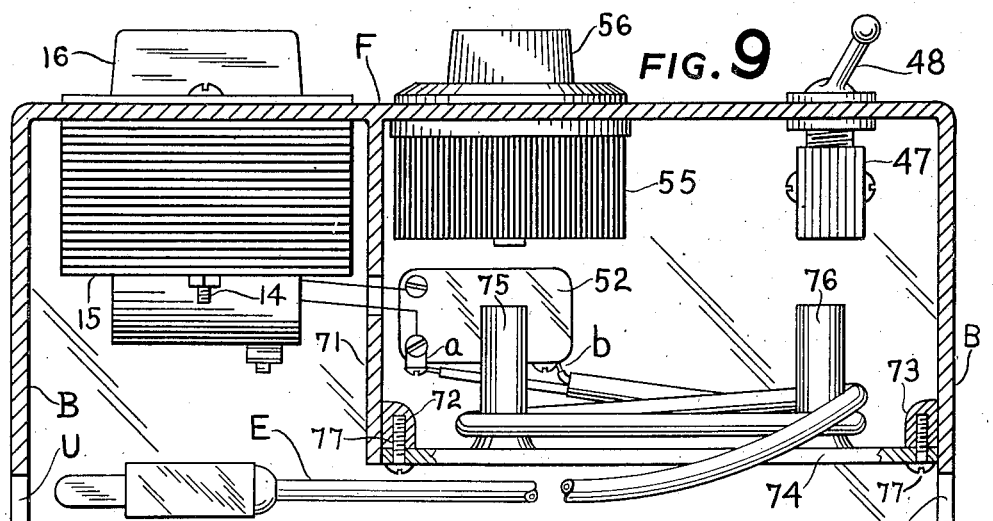
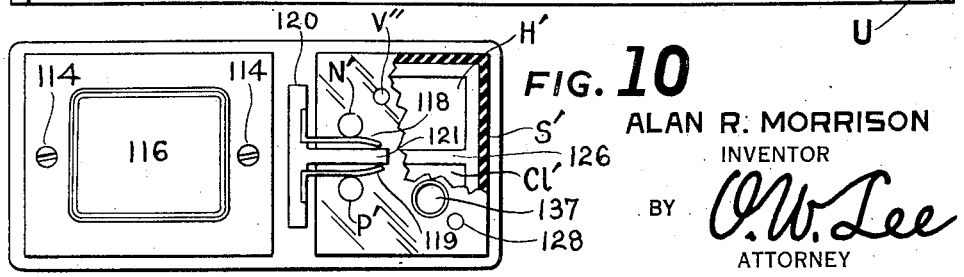
ALAN R. MORRISON
INVENTOR
BY O. W. Lee
ATTORNEY Patented Sept. 16, 1941

2,256,212

UNITED STATES PATENT OFFICE 2,256,212

INHALATOR

Alan R. Morrison, Spokane, Wash., assignor to Emmett L. Harrigan, Lakewood, Ohio Application June 6, 1939, Serial No. 277,639

18 Claims. (Cl. 128—185)

The present invention relates to an improved inhalator for therapeutic administration of chlorine gas in the treatment of certain human ailments, such as infections of the post nasal cavity, nasal ducts, sinus infections, common colds, and other infections which can be reached through the nasal cavity.

The invention provides an improved means for extemporaneously producing fresh chlorine gas by electrolysis, and the immediate administration of the chlorine by inhalation while the chlorine is in the fresh state undeteriorated and free from contamination.

The invention provides a convenient means for administering fresh chlorine gas in a quantity flow sufficient for the required purposes and in such moderation that the patient can readily tolerate the chlorine. Provision is also made for administering air along with the chlorine according to the sensitiveness of the patient.

Clinical experience has proven that after each inhalation of chlorine, there is considerable flow of moisture, mucous and other secretions, and that infected sinuses are effectively drained and the patient materially benefited. The discharge of such secretions, and the antiseptic, disenfectant, deodorant and bactericide effect of the chlorine is of therapeutic value in the treatment of infections of the nature hereinbefore referred to.

Chemical generation of chlorine by hydrochloric acid and potassium chlorate is not suited for inhalation, for the reason that the chlorine is intermingled with some hydrochloric acid gas which is irritating to the membranes and otherwise objectionable. The commercial cylinders of chlorine are not convenient for such administration and furthermore it would be unsafe to entrust the laity with chlorine under pressure. Furthermore, for inhalation, it is essential that the chlorine be adequately intermingled with air, and neither of these modes provide that essential.

The present invention provides a gradual administration of chlorine in a manner that can be safely entrusted to the patient, when the physician deems such advisable.

The invention embodies a low voltage transformer and a low amperage rectifier and a pair of electrodes for acting upon an electrolyte such as a solution of sodium chloride, and is used on alternating current to generate chlorine. The electrodes are mounted in a small capacity electrolyte reservoir having a cover and divided into two compartments so as to segregate the chlorine from the inherently present hydrogen. To assure that the same electrode will produce the chlorine at each instance of use, friction contact terminals engage with the electrodes in one position only, so that the polarity of the electrodes can not be reversed. Means are provided to intermingle air with the chlorine, and a nasal tip tube is provided for convenient inhalation and to obviate unnecessary escape of the chlorine. Means are provided to administer suitable volatile substances along with the chlorine.

The device is small and, compact, and can readily be taken to the bedside of a patient and connected to any nearby A. C. outlet. This eliminates the necessity of bringing the patient to the device, and any number of patients, variously situated, can be treated in rotation.

The accompanying drawings illustrate the physical embodiment of the invention.

Fig. 4 shows an underside plan view and discloses the wiring diagram; parts of the casing are broken away and the partitions omitted for the sake of clarity.

Fig. 5 shows an enlarged section taken on the line 5—5 of Fig. 2.

Fig. 6 shows a vertical section of the electrolyte reservoir and its cover.

Fig. 7 shows a vertical section of Fig. 10.

Fig. 8 shows a section taken on the line 8—8 of Fig. 1.

Fig. 9 shows a section taken on the line 9—9 of Fig. 1.

Fig. 10 shows a plan view of a simplified form of the invention, a part being broken away.

In the practical embodiment of the invention, the principal parts are housed within a casing B having a face plate F upon the exterior of which the manually operated parts are mounted. The face plate F may be integral with the casing or applied thereto. The transformer 15 is positioned on the underside of the face plate F, and the transformer coil protrudes through a suitable opening in the face plate. A cap 16 covers the coil, and bolts 14—14 hold the transformer and its cap in fixed relation with the face plate. Adjacent the transformer, a rectifier 17 is mounted on the underside of the face plate and in circuit with the transformer. Terminals 18 and 19 are mounted exteriorly upon the face plate and in circuit with the rectifier. The electrolysis reservoir R is demountably positioned exteriorly on the face plate with its electrodes N and P in frictional contact with the terminals 18 and 19. The electrodes are preferably in the form of rods and should be either carbon or graphite, because most metals are corroded by sodium chloride electrolysis.

Figure 1:
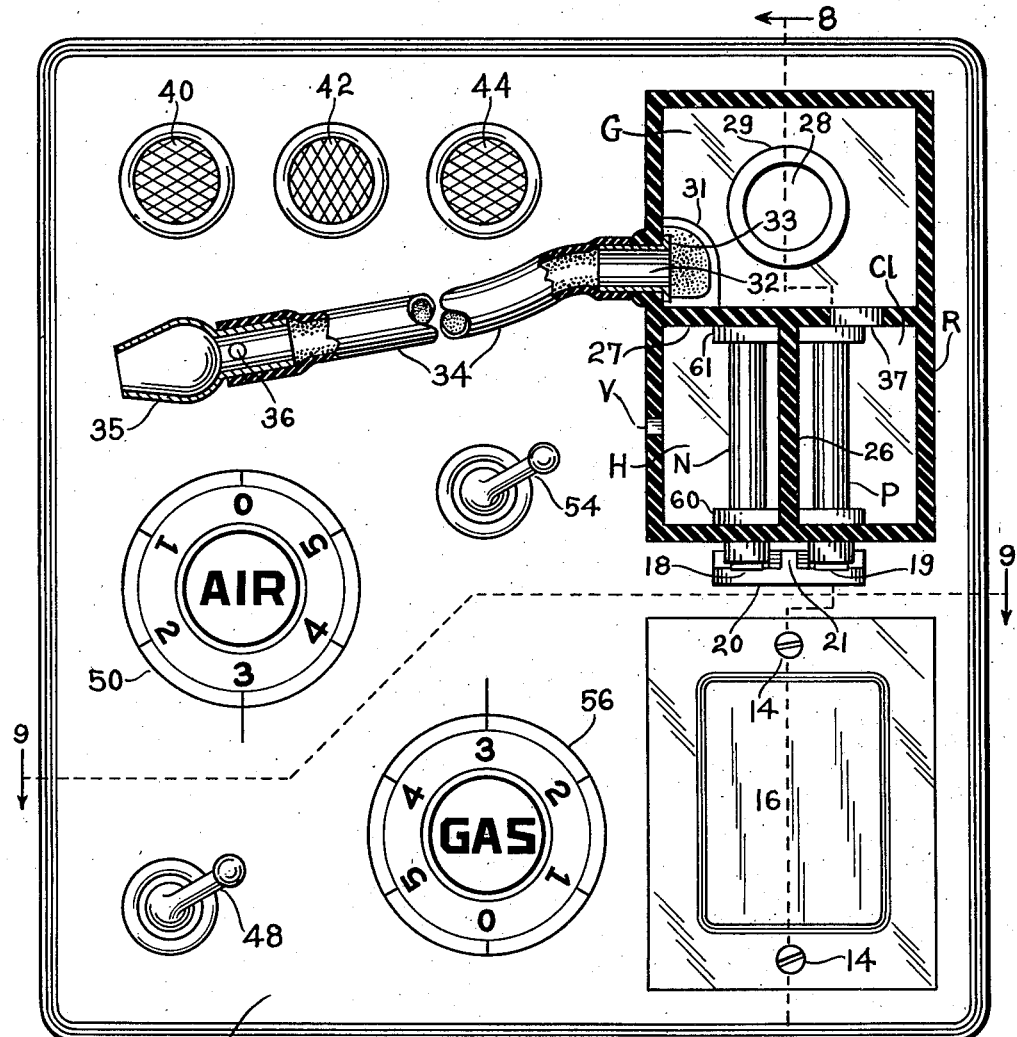
Fig. 1 shows a top plan view, with parts shown in section.

In the preferred form, the electrolysis reservoir R is divided into three compartments. As best seen in Fig. 1, a partition 27 divides this reservoir into a collection chamber G and an electrolyte sump which has a septum 26 dividing it into two compartments H and Cl. As shown in Fig. 6, the septum 26 ends a short distance from the bottom of the sump and the electrolyte liquid forms a seal to keep the hydrogen gas segregated from the chlorine. A pair of electrodes N and P are mounted in this sump, one on each side of the septum 26. Preferably, these electrodes are disposed horizontally so as to get maximum immersion with a minimum quantity of electrolyte liquid, and also to avoid having them pass through the cover of the reservoir. Furthermore, these horizontal electrodes assure that the polarity can not be reversed because the electrodes engage the terminals 18 and 19 in one position only, a reversed position being impossible. The terminal 18 is connected to the negative pole of the rectifier, and the terminal 19 is connected to the positive pole of the rectifier, and since the electrodes engage with these terminals in one position only, there is assurance that the hydrogen will not become the gas inhaled and the chlorine the gas discarded. The hydrogen escapes through the vent V and is discarded and the chlorine passes through the port 37 into the collection chamber G where it is then intermingled with air so as to make the chlorine more suitable for inhalation.

As shown in Fig. 8 the bottom of the collection chamber G is provided with an air inlet tube 29 which extends downwardly through an opening in the face plate F, a tapered sleeve 30 being provided to facilitate engagement and disengagement. It will also be noted that this engagement of the air inlet tube holds the reservoir R in fixed relation with the terminals 18 and 19 and eliminates the need of other holding means. The air inlet tube 29 extends an appropriate distance upwardly into the collection chamber so that a liquid can be retained in the chamber and also to obviate down flow of the chlorine which of course is heavier than air.

The reservoir R is arranged above the rectifier 17 which is mounted on the under side of the face plate F; and a motor driven fan M is mounted on the underside of the face plate and positioned so as to direct a current of air towards the rectifier and the air inlet tube 29. The base of the casing B is shown cut away at U—U to provide for air entrance, and like provision on the opposite side provides for air exhaust; additional apertures such as W may be provided if desired.

This fan provides an air flow which effectively holds the chlorine against descending from the collection chamber G; and during inhalations, the air from the fan will flow through the passage 28 and intermingle with the chlorine so as to make it more suitable for inhalation.

The collection chamber G is provided with an outlet 32 to which is connected a suitable length of flexible tubing 34 having a nasal tip 35 at its terminal end. This nasal tip 35 may be provided with one or more air inlets 36 to further alter the proportion of air and chlorine. These air inlets may be opened and closed by sliding the shank of the nasal tip in and out of the tubing, and when an air inlet is exposed, the patient can readily control its function by covering it with one finger, more or less, as judgement indicates.

To provide for administering volatile therapeutic agents along with the chlorine, a small basin 31 is disposed at the outlet 32 so that the vapors of any volatile substance placed therein will intermingle with the chlorine as it passes through the outlet 32. This basin is particularly intended for eucalyptol, which I have discovered, greatly increases the tolerance of chlorine inhalation, and enables the patient to inhale a higher percentage of chlorine and for a longer interval. Oil of eucalyptus will also serve the purpose. Either of these may be placed in the basin 31, or they may be placed in the bottom of the collection chamber G, the air tube 29 rising a suitable distance above the bottom to prevent draining into the passage 28.

Various other volatile substances such as camphor, menthol, phenol, thymol, etc. may be placed in the basin 31 and administered along with the chlorine, should the physician so direct. The quantity required in any instance is small and the basin 31 need have but a small capacity of less than one gram.

It is important that the chlorine be generated at the proper rate for the purposes of inhalation. The rate of electrolysis depends upon the conductivity of the electrolyte, the size of the carbons, the spacing of the carbons and the extent of their immersion in the electrolyte, all of which affect the amperage and consequently the generation of the chlorine. Satisfactory generation of chlorine can be obtained with a current of 1 amp. and 4.5 volts D. C. The amperage may vary from .5 amp. to 1.5 amps., and the voltage may vary from 4 volts to 6 volts D. C. More than six volts D. C. is unnecessary for the required purpose and needlessly adds to the cost of the transformer, and also detracts from rheostat control, for the reason that in transformer-rectifier units, excessive reduction by rheostat is objectionable.

Preferably, the transformer and rectifier deliver 6 volts D. C. at 1.5 amp. and reduction is accomplished by rheostat, and or, by diluting the electrolyte solution to lessen the amperage. Preferably, the electrolyte solution is prepared as a saturated solution of sodium chloride, and it is advisable to add from 5% to 10% sulphuric acid, as this increases the conductivity and raises the amperage, and also maintains the electrolyte clear and free from carbon exfoliation which otherwise occurs from the alkalinity resulting from the sodium hydroxide formed by the electrolysis. This electrolyte is suitably diluted before use so as to obviate the sodium chloride incrustations which would otherwise occur from electrolysis of a saturated solution, and the extent of dilution can be employed to decrease the amperage if required.

The electrolyte reservoir is preferably small, so that an ounce or an ounce and a half of electrolyte solution will suffice for operation. A larger quantity of electrolyte absorbs considerable chlorine and requires a longer period of operation before maximum output of chlorine is obtained. In order that a small quantity of electrolyte may suffice, the electrodes are horizontally disposed near the bottom of the electrolyte sump and it is only necessary to use sufficient electrolyte to cover the electrodes. The horizontal position of the electrodes provides maximum immersion with a minimum quantity of electrolyte. The electrodes should be spaced as close together as conveniently practical, for the reason that nearness increases the amperage and enhances the generation of chlorine.

Figure 2:
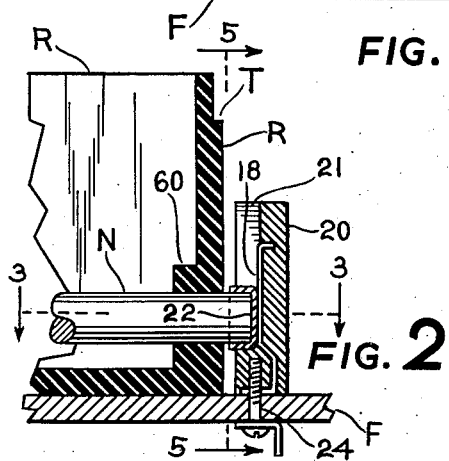
Fig. 2 is an enlarged fragmentary section showing the means for registering the electrodes with the terminals.
Figure 3:
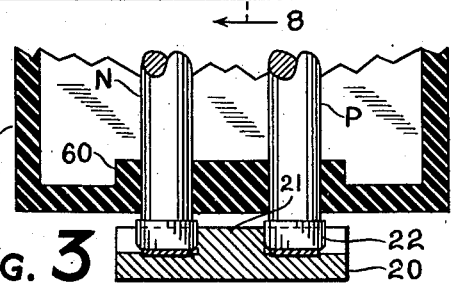
Fig. 3 shows enlarged fragmentary section taken on the line 3—3 of Fig. 2.

As indicated in Figures 1, 2 and 3, the electrolysis reservoir R may be made of rubber. The rubber should be sufficiently elastic to enable the electrodes N and P to be introduced through suitable openings and held in a leak proof manner by the elasticity of the rubber. Reinforcements such as 60 and 61 may be provided on the walls of the electrolyte sump to enhance the union of the rubber with the electrodes.

As indicated in Fig. 8, the reservoir may be made of glass or other suitable material, in which case, elastic rubber gaskets such as 62 and 63 are inserted into the reinforcements 60' and 61' so as to form a leak proof union at the entrance of the electrodes and a suitable support at the opposite ends.

The electrodes being thus fixed in their respective compartments they can be frictionally engaged with fixed terminals, with assurance that the polarity will not be reversed and the chlorine generated in the wrong compartment. As shown in Figures 1, 2, 3 and 5, the terminals 18 and 19 are mounted in a vertical block 20 which has a central spacer 21 disposed between these terminals. Suitable bolts 24 and 25 secure the block 20 rigid with the face plate F and also form terminal connections on the underside of the face plate. The width of the spacer block 21 is complementary to the spacing of the electrodes and its upper end is tapered so as to facilitate guiding the electrodes to register with the terminals 18 and 19 where they are held in contact by the previously described air inlet tube 29 engaging with the sleeve 30 formed on the underside of the face plate F. This structure provides for instant removal and replacement of the reservoir R, with assurance of proper electrical circuit free from reversed polarity which might otherwise occur were flexible connections employed. The electrodes may be provided with caps 20 to protect them from abrasion.

All wiring is on the underside of the face plate F which also carries switches and rheostats for the electrodes and the aforesaid fan motor M. Fig. 4 diagrammatically illustrates the wiring system. The lead-in wires from the power plant are indicated at a—b and a switch is indicated at 51, and this switch is preferably housed in the box 52 shown in Fig. 8 and Fig. 9. These lead-in wires connect to the primary winding of the transformer 15 and energize the secondary winding thus supplying current to the wires c and d which light the pilot light 43 which shows through the signal glass 42, thus indicating when the transformer is operating. The wire c also connects to the pilot lights 41 and 45 and to the rectifier 17. The wire d also connects to the rectifier through the switch 53 having an exterior handle 54, and then connects to the pilot light 45 which shows through the signal glass 44 thus indicating when the rectifier switch is closed. These same secondary lines c and d could be conveniently connected to the motor M, but in the present instance, secondary lines e and f are shown connected to the motor M. The line e is connected to the motor M through the rheostat 49 having a control knob 50 exteriorly on the face plate. The line f is connected to the motor M through the switch 47 having a handle 48 exteriorly on the face plate, and this line f then connects to the pilot light 41 which is already on the line c from the opposite side of the transformer. The pilot light 41 shows through the signal glass 40 thus indicating when the motor switch is closed. The line h connects the positive plate of the rectifier with the terminal 19 through the screw 25, and the line g connects the negative plate of the rectifier to the terminal 18 through the screw 24 and through the rheostat 55 which has a control knob 56 exteriorly on the face plate. Thus, the motor M and the rectifier 17 can each be separately operated, and separately controlled, and both can be stopped by opening the switch 51 without altering the switches 53 and 47 or disturbing the rheostats 49 and 55; and in either instance, the pilot lights will indicate which circuits are closed. It should be mentioned that the numbering on the dials 50 and 56 are arbitrary and are not intended to indicate a rheostat having a resistance equal to the total current on its respective line.

In the present instance, the center plate of the rectifier is considered as the positive pole, and it will be understood that such rectifiers are also made with the center plate as the negative pole. For this reason, the terms negative and positive as here used, refer to the polarity without particular reference to either the center plate or the end plate.

It is essentially necessary to provide the electrolysis reservoir R with a cover which will effectively confine the chlorine. In Fig. 6 the cover L is shown as made of flexible rubber reinforced exteriorly by ribs K, one rib being positioned above each of the four walls of the reservoir, one above the partition 27, and one above the septum 26. These ribs provide close contact of the cover L with the free edges of the reservoir and afford a satisfactory seal which may be further enhanced by the skirt S on the cover fitting over the reservoir; and if desired, a shoulder T may be provided complementary to the skirt S.

As shown in Fig. 8, the cover L' is made of glass, and ribs K' are provided on the underside of the cover. These ribs K' register with the free edges of the reservoir and with the partition 27 and the septum 26; and all of the contacting surfaces are ground to afford close contact. This structure provides an effective seal which may be further enhanced by applying a suitable lubricant to the surfaces. A mucilaginous substance which is readily removed by washing is preferable to petrolatum. Agar-agar jelly, quince seed mucilage, or else ordinary bandoline will serve the purpose.

In electrical devices it is usual to provide five or six feet of extension cord, and there is always the problem of handling the length of cord that is not actually required. Fig. 8 and Fig. 9 show an improved structure for winding any portion or all of the extension cord E upon a fixed spool concealed in the housing B. As shown in Fig. 8, a partition 71 extends between the casing B and the partition 70, and as shown in Fig. 9 lugs 72 and 73 are provided on the casing B and the partition 71. A support 74 is bolted to the lugs 72 and 73. Fixed to the support 74 are standards 75 and 76 which form a spool upon which the extension cord E may be wound. As shown in Fig. 8 ample clearance is provided on each side of the support 74 and the cord E can be wound and unwound from the spool by lifting each loop over the top of the standards 75 and 76, whereupon the cord will remain in position at any desired length, the used portion passing out through the leg like openings at U. For original shipments, the cord can be machine wound and then slipped over the standards 75 and 76 and secured in place by means of any suitable band passed around the wound cord and the support 74, after which the support may be mounted in position by means of the screws 77. Later removal of the securing band enables the extension cord to be unwound to any desired extent by merely lifting loop after loop over the top of the standards.

In the operation of the device the electrolysis reservoir R is removed and the electrolyte sump supplied with a small quantity of solution of sodium chloride sufficient to cover the electrodes. The external ends of the electrodes are then positioned on opposite sides of the spacer block 21 and the reservoir is pushed down to seat on the face plate F with the air inlet tube 29 engaging with the sleeve 30 to hold the electrodes in contact with the terminals 18 and 19. The reservoir is then covered and the device is ready for operation when connected to a current supply and the disclosed switches closed. The electrolysis will produce hydrogen at the electrode N and chlorine at the electrode P. When sulphuric acid is used in the electrolyte, independent electrolysis of the water will also occur and oxygen will be generated at the electrode P along with the chlorine; however, the oxygen is advantageous. The generation of chlorine can be controlled by turning the rheostat dial 56 and the air current can be controlled by turning the rheostat dial 50. The patient inhales the chlorine, oxygen, and air through the nasal tip 35 and may utilize the air inlet 36 to admit additional air. The generation of chlorine can be stopped by opening the switch 53 by means of the handle 54. The air current may be stopped by opening the switch 47 by means of the handle 48, and the patient can then inhale chlorine and oxygen with only so much air as may be admitted through the air inlet 36. A volatile medicament may be supplied in the basin 31 and inhaled with air alone or else along with the chlorine and oxygen.

By use of the dials 50 and 56, the proportions of chlorine and air can be varied according to the toleration of the patient, and the device can be readily regulated according to individual requirements. The electrolysis reservoir can be removed after each instance of use and properly cleansed, and then replaced with certainty that the polarity of the electrodes will not be reversed. The operation of the entire device can be stopped by opening the switch 51 without disturbing any of the other controls. The pilot lights indicate which switches are closed and guide the operator in efficiently operating the device. The general rate of chlorine generation can be regulated by diluting the electrolyte and this together with the rheostat control enables the operator to meet the individual requirements of any patient, with a variation from the minimum to the maximum intensity of chlorine suitable for inhalation.

Fig. 10 and Fig. 7 show a simplified form of the device wherein the various switches, rheostats, pilot lights, and collection chamber are omitted. This form of the device consists of merely the previously described transformer and rectifier in circuit with the terminals 118 and 119 which are spaced apart by the horizontal divider 121 which projects from the standard 120. This construction positions these terminals so as to engage the electrodes N' and P' which pass vertically through the cover L" of the electrolyte reservoir R' which is provided with a septum 126. In this form of the invention, the hydrogen vent V" and chlorine outlet 137 and air inlet 128 are placed in the cover L" instead of in the walls of the reservoir as was previously described by referring to similar parts by these same numerals minus 100.

In this simplified form, the inhaler tube is connected to the outlet 137. The generation of the chlorine is controlled by diluting the electrolyte and also by the depth to which the electrodes are immersed by the quantity of electrolyte employed, no other regulation being employed. Here the reservoir is shown as made of glass with a flexible rubber cover L" having a skirt S' and reinforced at 160 to securely hold the electrodes which pass vertically therethrough sufficiently near to one side of the cover as to assure that they cannot be engaged in reversed position with the terminals 118 and 119. This simplified form of the invention is intended for home use and can readily be operated by the patient, to whom it can be supplied at a very moderate cost.

In the present disclosure I claim as my invention:

1. An inhalator comprising a small capacity electrolyte reservoir having a septum dividing the same into two compartments, a closure for said reservoir, a pair of electrodes mounted in said reservoir and on opposite sides of said septum, one of said compartments being vented, a gas chamber communicating with the other of said compartments, an inhaler tube leading from said gas chamber, means for supplying a current of air to said gas chamber, a low voltage transformer, a low amperage rectifier in circuit with said transformer and with said electrodes, the positive pole of said rectifier being connected to that electrode which is in the compartment communicating with said gas chamber.

2. An inhalator comprising a small capacity electrolyte reservoir having a septum dividing the same into two compartments, a pair of electrodes mounted in said reservoir and on opposite sides of said septum, a closure for said reservoir, one of said compartments being vented, a gas chamber communicating with the other of said compartments, an inhaler tube leading from said gas chamber, means for supplying a current of air to said gas chamber, a low voltage transformer, a low amperage rectifier in circuit with said transformer and with said electrodes, the positive pole of said rectifier being connected to that electrode which is in the compartment communicating with said gas chamber, and a basin mounted in said gas chamber.

3. An inhalator comprising a small capacity electrolyte reservoir having a septum dividing the same into two compartments, a pair of electrodes mounted in said reservoir and on opposite sides of said septum, a closure for said reservoir, one of said compartments being vented, a gas chamber communicating with the other of said compartments, an inhaler tube leading from said gas chamber, a low voltage transformer, a low amperage rectifier in circuit with said transformer and with said electrodes, the positive pole of said rectifier being connected to that electrode which is in the compartment communicating with said gas chamber, a rheostat for reducing the current supplied to said electrodes, said gas chamber having an air inlet disposed adjacent said rectifier, an electric fan positioned so as to direct a current of air towards said air inlet and said rectifier, and a rheostat for reducing the current supplied to said fan.

4. An inhalator comprising a small capacity electrolyte reservoir having a septum dividing the same into two compartments, a closure for said reservoir, a pair of electrodes mounted in said reservoir and on opposite sides of said septum, one of said compartments being vented, an inhaler tube communicating with the other of said compartments, a low voltage transformer, a low amperage rectifier in circuit with said transformer, a pair of fixedly mounted terminals in circuit with said rectifier and spaced apart so as to engage with said electrodes, said electrodes disposed so as to engage said terminals in only one position with the positive pole of said rectifier leading to that one of said electrodes which is in the compartment which communicates with said inhaler tube, said reservoir detachably mounted with its electrodes in frictional engagement with said terminals, and means for effecting registration of said electrodes with said terminals.

5. An inhalator comprising a casing, a low voltage transformer and a low amperage rectifier mounted in circuit within said casing, a small capacity electrolyte reservoir demountably seating upon said casing, a septum dividing said reservoir into two compartments, a pair of electrodes mounted in said reservoir and on opposite sides of said septum, a cover for said reservoir, one of said compartments being vented, an inhaler tube communicating with the other of said compartments, a pair of terminals mounted in a fixed position upon the exterior of said casing and in circuit with said rectifier, said terminals and said electrodes being arranged so that when said reservoir is seated upon said casing said electrodes will engage with said terminals in one position only and with the positive pole of said rectifier connected to that electrode which is in the compartment which communicates with said inhaler tube.

6. An inhalator comprising a small capacity electrolyte reservoir having a septum dividing the same into two compartments, a pair of electrodes mounted horizontally in said reservoir and on opposite sides of said septum and with one end of each electrode exteriorly exposed, a closure for said reservoir, one of said compartments being vented, an inhaler tube communicating with the other of said compartments, a low voltage transformer, a low amperage rectifier in circuit with said transformer and with said electrodes, the positive pole of said rectifier being connected with that electrode which is in the compartment communicating with said inhaler tube.

7. An inhalator comprising a small capacity electrolyte reservoir having a septum dividing the same into two compartments, a pair of electrodes mounted horizontally in said reservoir and on opposite sides of said septum and with one end of each electrode exteriorly exposed, a closure for said reservoir, one of said compartments being vented, an inhaler tube communicating with the other of said compartments, a low voltage transformer, a low amperage rectifier in circuit with said transformer, a pair of fixedly mounted terminals in circuit with said rectifier and disposed so as to engage said electrodes in only one position with the positive pole of said rectifier leading to that one of said electrodes which is in the compartment which communicates with said inhaler tube, said reservoir detachably mounted with its electrodes in frictional engagement with said terminals, and means for effecting registration of said electrodes with said terminals.

8. An inhalator comprising a small capacity electrolyte reservoir of elastic rubber, a septum dividing said reservoir into two compartments, a pair of electrodes horizontally disposed on opposite sides of said septum and penetrating the outer wall of said reservoir with the elasticity of the rubber affording a leak-proof union, a closure for said reservoir, one of said compartments being vented, an inhaler tube communicating with the other of said compartments, a low voltage transformer, a low amperage rectifier in circuit with said transformer and with said electrodes, the positive pole of said rectifier being connected to that electrode which is in the compartment communicating with said inhaler tube.

9. An inhalator comprising an electrolysis reservoir having a partition dividing the same into a gas chamber and an electrolyte sump, a septum dividing said sump into two compartments, a pair of electrodes mounted horizontally in said sump and on opposite sides of said septum and with their ends exteriorly exposed, one of said compartments being vented and the other of said compartments communicating with said gas chamber, an inhaler tube leading from said gas chamber, an elastic rubber cover seating upon said partition and said septum and upon the walls of said reservoir, external ribs on said cover arranged along said seating portions, a skirt upon said cover and embracing the walls of said receptacle, a low voltage transformer, a low amperage rectifier in circuit with said transformer and with said electrodes, the positive pole of said rectifier being connected to that electrode which is in the compartment communicating with said gas chamber.

10. An inhalator comprising a small capacity electrolysis reservoir having a partition dividing the same into a gas chamber and an electrolyte sump, a septum dividing said sump into two compartments, a pair of electrodes mounted horizontally in said sump and on opposite sides of said septum and with their ends exteriorly exposed, one of said compartments being vented and the other of said compartments communicating with said gas chamber, a plate member, ribs on said plate member registering with the walls of said electrolysis reservoir and with said partition and with said septum and the meeting surfaces thereof being ground to contact, said ribbed plate member constituting a gravity closure for said compartments and said gas chamber, an inhaler tube leading from said gas chamber, a low voltage transformer, a low amperage rectifier in circuit with said transformer and with said electrodes, the positive pole of said rectifier being connected to that electrode which is in the compartment communicating with said gas chamber.

11. An inhalator comprising a casing, a low voltage transformer and a low amperage rectifier mounted in circuit within said casing, a covered electrolysis reservoir demountably seating upon the exterior of said casing, said reservoir having a partition dividing the same into a gas chamber and an electrolyte sump, a septum dividing said sump into two compartments, a pair of electrodes mounted horizontally in said sump and on opposite sides of said septum and with their ends exteriorly exposed, one of said compartments being vented and the other of said compartments communicating with said gas chamber, an air inlet tube opening through the bottom of said gas chamber and extending downwardly through an opening in said casing adjacent said rectifier, an electric fan in circuit with said transformer and mounted within said casing and in position to direct a current of air towards said rectifier and said air inlet tube, an inhaler tube leading from said gas chamber, a pair of terminals spaced apart complementary to the separation of said electrodes and fixedly mounted exteriorly upon said casing in position to contact said electrodes when said reservoir is seated upon said casing with said air inlet tube engaged in the aforesaid opening, and means to effect register of said electrodes with said terminals.

12. An inhalator comprising a casing, a low voltage transformer and a low amperage rectifier mounted in circuit within said casing, an extension cord connected to said transformer, a support secured within said casing, a winding spool rigidly secured in upright position upon said support so as to receive said extension cord by repeatedly looping the same over said spool from below said support, a small capacity electrolyte reservoir demountably seating upon said casing, a septum dividing said reservoir into two compartments, a pair of electrodes mounted in said reservoir and on opposite sides of said septum, a cover for said reservoir, one of said compartments being vented, an inhaler tube communicating with the other of said compartments, a pair of terminals mounted in a fixed position upon the exterior of said casing and in circuit with said rectifier, said terminals and said electrodes being arranged so that when said reservoir is seated upon said casing said electrodes will engage with said terminals in one position only and with the positive pole of said rectifier connected to that electrode which is in the compartment which communicates with said inhaler tube.

13. An inhalator comprising a small capacity electrolyte reservoir having a septum dividing the same into two compartments, a pair of electrodes mounted in said reservoir and on opposite sides of said septum, a closure for said reservoir, one of said compartments being vented, an inhaler tube communicating with the other of said compartments, a hollow nasal tip on the end of said inhaler tube, said nasal tip having a lateral air inlet, a low voltage transformer, a low amperage rectifier in circuit with said transformer and with said electrodes, the positive pole of said rectifier being connected to that electrode which is in the compartment communicating with said inhaler tube.

14. An inhalator comprising an electrolyte receptacle having a septum dividing the same into two compartments, a pair of electrodes mounted in said receptacle and on opposite sides of said septum, an exhaust port for one of said compartments, a gas chamber communicating with the other of said compartments, an inhalator conduit leading from said gas chamber, an air inlet port in said gas chamber, means for causing a current of air to flow through said inlet port, a transformer, a rectifier connected to said transformer, and connections between said rectifier and said electrodes.

15. An inhalator comprising a small capacity electrolyte reservoir, a pair of electrodes mounted in said reservoir, a closure for said reservoir, a gas chamber communicating with said reservoir, an inhaler tube leading from said gas chamber, a low voltage transformer, a low amperage rectifier in circuit with said transformer and with said electrodes, said gas chamber having an air inlet disposed adjacent said rectifier, and an electric fan positioned so as to direct a current of air towards said air inlet and said rectifier.

16. An inhalator comprising a small capacity electrolyte reservoir, a pair of electrodes mounted horizontally in the lower part of said reservoir and with one end of each electrode exteriorly exposed, a closure for said reservoir, an inhaler tube communicating with said reservoir, a low voltage transformer, and a low amperage rectifier in circuit with said transformer and with said electrodes.

17. An inhalator comprising a small capacity electrolyte reservoir of elastic rubber, a pair of horizontally disposed electrodes penetrating the outer wall of said reservoir with the elasticity of the rubber affording a leak-proof union, said electrodes being positioned near the bottom of said reservoir, a closure for said reservoir, an inhaler tube communicating with said reservoir, a low voltage transformer, and a low amperage rectifier in circuit with said transformer and with said electrodes.

18. An inhalator comprising a casing, a low voltage transformer and a low amperage rectifier mounted in circuit within said casing, a covered electrolysis reservoir demountably seating upon the exterior of said casing, said reservoir having a partition dividing the same into a gas chamber and an electrolyte sump, a pair of electrodes mounted horizontally in said electrolyte sump and with their ends exteriorly exposed, said electrolyte sump communicating with said gas chamber, an air inlet tube opening through the bottom of said gas chamber and extending downwardly through an opening in said casing adjacent said rectifier, an electric fan in circuit with said transformer and mounted within said casing and in position to direct a current of air towards said rectifier and said air inlet tube, an inhaler tube leading from said gas chamber, a pair of terminals spaced apart complementary to the separation of said electrodes and fixedly mounted exteriorly upon said casing in position to contact said electrodes when said reservoir is seated upon said casing with said air inlet tube engaged in the aforesaid opening, and means to effect register of said electrodes with said terminals.

ALAN R. MORRISON.